United States Patent [19]

McEndarfer

[11] Patent Number: 5,580,232
[45] Date of Patent: Dec. 3, 1996

[54] ROTOR ASSEMBLY HAVING A SLIP JOINT IN THE SHAFT ASSEMBLY

[75] Inventor: Kenn R. McEndarfer, Bremen, Ind.

[73] Assignee: Kobelco Compressors (America), Inc., Elkhart, Ind.

[21] Appl. No.: 434,721

[22] Filed: May 4, 1995

[51] Int. Cl.⁶ .............................. F04C 18/16; F04C 29/00; F16C 3/03; F16D 3/06
[52] U.S. Cl. ...................... 418/83; 418/179; 418/201.1; 418/206.9; 29/888.023; 416/244 R; 464/162
[58] Field of Search ............................ 418/83, 179, 182, 418/201.1, 206.1, 206.3, 206.9; 464/162; 416/244 R; 29/888.023

[56] References Cited

U.S. PATENT DOCUMENTS

| | | | |
|---|---|---|---|
| 4,595,349 | 6/1986 | Preston et al. | 418/201.1 |
| 4,828,467 | 5/1989 | Brown | 418/201.1 |
| 5,195,880 | 3/1993 | Gruber | 418/182 |
| 5,295,788 | 3/1994 | Tajima et al. | 418/201.1 |

FOREIGN PATENT DOCUMENTS 4272491   9/1992   Japan .................................. 418/179

*Primary Examiner*—John J. Vrablik
*Attorney, Agent, or Firm*—Oblon, Spivak, McClelland, Maier, & Neustadt, P.C.

[57] ABSTRACT

A rotor assembly in which the front and back ends of the rotor are coupled by a shaft assembly extending therethrough. Preferably, the shaft assembly includes a slip joint, such that the shaft is able to accommodate for thermal expansion of the assembly, while maintaining a torsional and bending moment coupling between the front and back ends of the rotor. The rotor assembly is particularly advantageous for use in superchargers having large acceleration and pressure increase requirements, such as superchargers utilized in drag racing. However, the rotor assembly may also be utilized in other devices such as blowers, compressors, or vacuum pumps which may have large acceleration requirements.

25 Claims, 3 Drawing Sheets

ROTOR ASSEMBLY HAVING A SLIP JOINT IN THE SHAFT ASSEMBLY

SUMMARY OF THE INVENTION

1. Field of the Invention

The invention relates to a rotor assembly, and is particularly applicable to superchargers requiring rapid acceleration and rapid pressure increases, such as in automobile or boat racing applications. However, the rotor assembly can also be advantageously utilized in other devices such as blowers, compressors or vacuum pumps which may be required to accelerate rapidly.

2. Discussion of Background

Superchargers utilized in the racing industry are required to undergo rapid acceleration and rapid pressure increases to provide a rapid boost/acceleration to the vehicle. For example, in a three-lobe helical rotary supercharger as typically utilized in drag racing, the supercharger idles at 4,000 rpm, and is accelerated up to 12,000 rpm in approximately 0.2 seconds. With this rapid acceleration, a large torque is developed on the rotor and rotor shaft, resulting in a significant amount of torsional deformation or torsional lag between the front and back of the rotor. In particular, the leading or front end of the rotor (i.e., the side coupled to a drive source) will lead (from an acceleration standpoint) the trailing or back end of the rotor, thus resulting in torsional deformation between the front and back ends of the rotor. In addition, with a discharge pressure of approximately 50 psi, the rotor encounters approximately 4,000–5,000 pounds of force, tending to bend or bow the rotor, particularly in combination with the torsional forces.

The above problem has become more pronounced as the length of rotor assemblies has increased. In particular, supercharger rotors in use today are approximately 19 inches in length, and 5.8 inches in diameter. Thus, the length/diameter ratio of approximately 3.3 is quite large as compared with that of a typical industrial rotary blower. As the length/diameter ratio increases, the possibility of bending/deformation of the rotor also increases, and the torsional lag between the front and back ends of the rotor becomes more pronounced.

Thus, the combination of high length/diameter ratios, high pressure increases, and rapid acceleration can result in relatively large deformation of the rotor, and lateral displacement of the midpoint of the rotor can be approximately 0.025 inches. In addition, accompanying the high pressure increases, the rotor temperature can rise to approximately 300° F., even when cooled by fuel injected into the rotor chamber.

In a conventional supercharger rotor assembly, independent shafts are provided on each end of the rotor body, and thus do not decrease or restrain bending or torsional deformation of the rotor body. Due to the bending and torsional deformation/lag, the rotors and the rotor housing are more apt to contact one another, thus increasing wear, and increasing the maintenance or repair requirements of the supercharger. To decrease wear, the clearances between the rotors (i.e., in a two rotor supercharger), and/or between the rotor and the housing can be increased. However, the increased clearance increases the internal gas leakage from the higher pressure regions to the lower pressure regions within the supercharger, thus decreasing the efficiency of the supercharger. Further, the increased clearances can result in an increase in the thermal expansion caused by the higher gas temperature, thus increasing the possibility of wear.

Accordingly, an improved rotor assembly is required which is able to accommodate for rapid acceleration and pressure increase requirements, despite the trend of increasing length/diameter ratios. The rotor assembly must also be able to withstand temperature variations which can accompany the extreme acceleration conditions.

SUMMARY OF THE INVENTION

Accordingly, it is an object of the present invention to provide an improved rotor assembly.

It is another object of the invention to provide a rotor assembly which is particularly advantageous for superchargers subjected to large rotor acceleration requirements and rapid pressure increases.

It is yet another object of the invention to provide a rotor assembly which reduces torsional lag and bending deformation along the axial length of the rotor assembly.

It is a further object of the present invention to provide a supercharger rotor assembly which is able to reduce wear, thereby reducing the frequency for which maintenance is required, and/or allowing the tolerances between rotors, or between the rotor and supercharger housing to be reduced.

It is a still further object of the invention to provide a rotor assembly which can accommodate thermal expansion in the axial direction of the rotor, while also reducing torsional deformation or torsional lag and bending/bowing of the rotor.

These and other objects and advantages are achieved in accordance with the present invention by providing a rotor assembly in which the leading or front side of the rotor is coupled to the or back side of the rotor by a rotor shaft assembly. In addition, to accommodate for thermal expansion in the axial direction, preferably a slip joint is provided between front and back shaft parts of the shaft assembly.

BRIEF DESCRIPTION OF THE DRAWINGS

A more complete appreciation of the invention and many of the attendant advantages thereof will be readily understood with reference to the following detailed description, particularly when considered in conjunction with the accompanying drawings, in which.

DESCRIPTION OF THE PREFERRED EMBODIMENTS

Although the rotor assembly of the present invention will be described with reference to a supercharger, it is to be understood that the present invention can also be applied to devices such as blowers, compressors, or vacuum pumps which may be subjected to rapid acceleration, thermal expansion and/or bending forces. In addition, although the invention is described with reference to a helical root or helical lobe type supercharger, the invention is applicable to various types of superchargers, such as straight lobe, screw-type or turbo type superchargers.

Figure 1A:
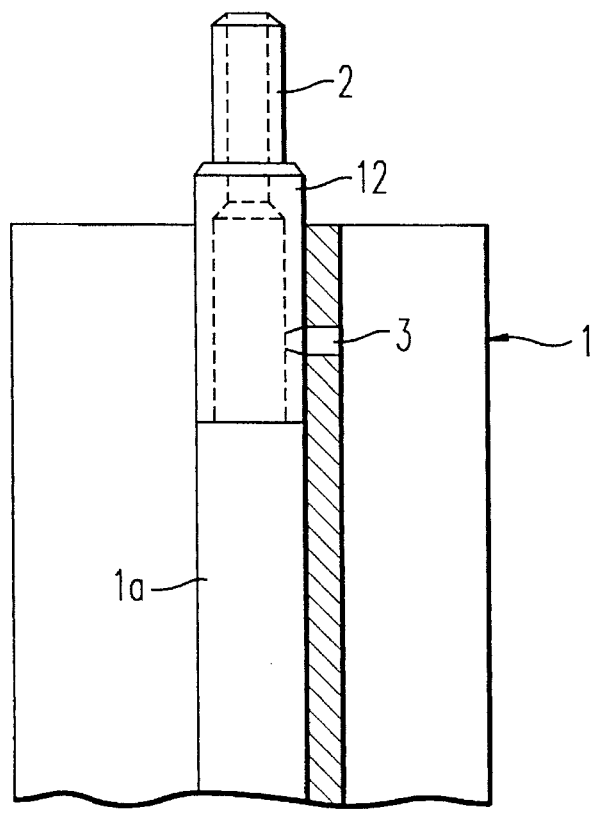
FIGS. 1A and 1B depict a conventional rotor assembly.
Figure 1B:
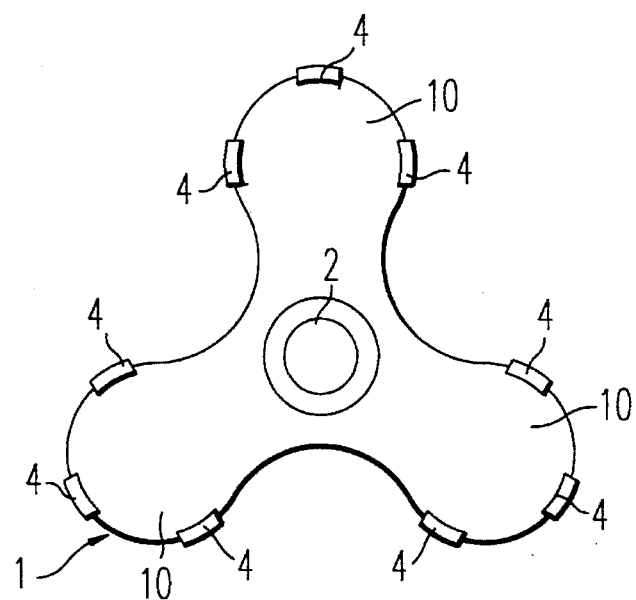

Referring now to the drawings, wherein like reference numeral designate identical or corresponding parts throughout the several views, FIGS. 1A and 1B depict a conventional supercharger rotor assembly. As shown in FIGS. 1A and 1B, the rotor assembly includes a rotor body 1 which includes a plurality of lobes 10 extending helically in the axial direction of the rotor body. In the embodiment shown in FIGS. 1A, 1B, three lobes 10 are provided.

As shown in FIG. 1A, in the conventional assembly, an input shaft 2 is provided which transmits torque to the rotor body 1. The input shaft 2 includes an enlarged diameter portion 12, which is received in a bore 1a of the rotor body with an interference fit. In addition, a taper pin 3 extends between the rotor body 1 and the shaft 2, for coupling the shaft 2 to the rotor body 1. In operation, the shaft 2 is coupled to a drive source (usually the engine), and the shaft 2 transmits torque to drive the rotor body 1, such that the supercharger conveys air into the engine. Although only one end of the rotor body and shaft are shown in FIG. 1A, it is to be understood that a similar shaft assembly 2 is provided at the opposite end of the rotor body, however the opposite shaft 2 is not driven, but is simply received in a bearing assembly to support the opposite side of the rotor body. The driven side (i.e. having the shaft 2 coupled to a drive source) of the rotor is referred to as the front, while the side which is simply supported for rotation is referred to as the back herein.

As discussed earlier, with the conventional assembly, particularly with the trend towards increasing acceleration rates and increasing the length/diameter ratio of the rotor, torque is first transmitted to the front end (i.e., the side of the rotor body having the shaft drivingly coupled to the engine) such that the trailing or back end of the rotor body lags the front end, which can result in tortional deformation between the front and back ends of the rotor. In addition, bending forces can result from high pressures or rapid pressure increases. Further, since the rotor body is typically aluminum (for low weight), a significant amount of thermal expansion/contraction results from temperature changes during operation. Thus, the rotor body is subjected to torsional deformation, bending forces, and thermal expansion.

As shown in FIG. 1B, sealing strips are provided to seal areas at which the rotor body contacts the housing or a mating rotor body. In the arrangement shown in FIG. 1B, three sealing strips 4 are provided for each lobe of the rotor body. The sealing strips at the apex of the lobe correspond to locations at which the rotor body contacts or is closely adjacent to the supercharger housing and the root or valley of a mating rotor, while the sealing strips on the sides of the lobes are provided at locations at which the rotor body contacts or is closely adjacent to a mating rotor body. Typically, the sealing strips 4 are formed of a plastic or Teflon material, and are relatively small, e.g. three-sixteenths on an inch in width. Once the sealing strips 4 wear, leakage can occur from the high pressure regions of the supercharger to the low pressure regions, thus reducing the efficiency of the supercharger, and requiring repair/replacement of the sealing strips 4. The plastic strips can wear rapidly when the supercharger is subjected to rapid acceleration and/or rapid pressure increases, due to the torsional and bending deformation of the rotor body, which in turn increases the contact/wear rate of the sealing strips. The sealing strips can even wear after a single use when the supercharger is subjected to particularly harsh conditions.

In accordance with the present invention, an arrangement has been recognized which reduces the deformation of the rotor body, thus reducing the wear and replacement requirements of components of the rotor assembly, particularly the sealing strips 4. In accordance with the present invention, deformation is prevented by coupling the front and back ends of the rotor body using a central shaft assembly, thereby reducing deformation between the front and back ends of the rotor.

Figure 2A:
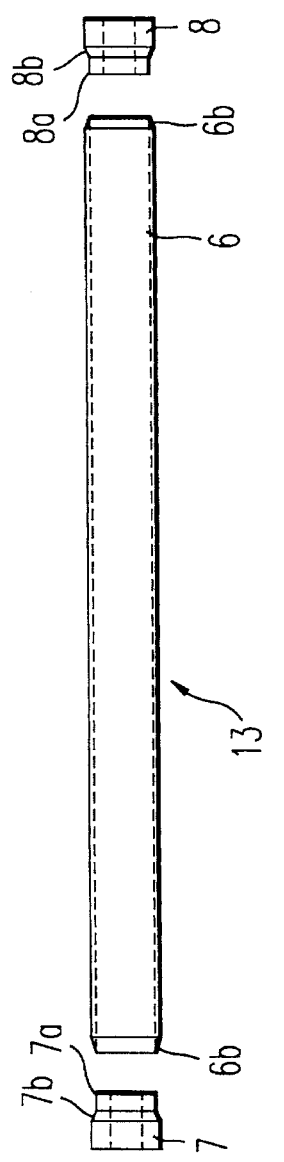
FIGS. 2A–2C depict a rotor and shaft assembly of the present invention.
Figure 2B:
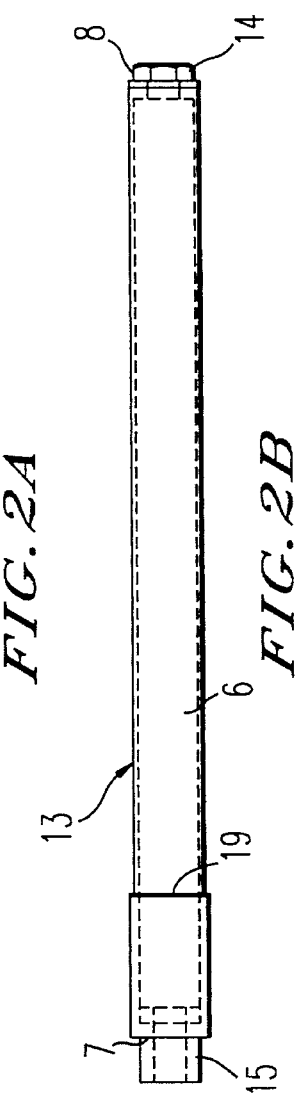
Figure 2C:
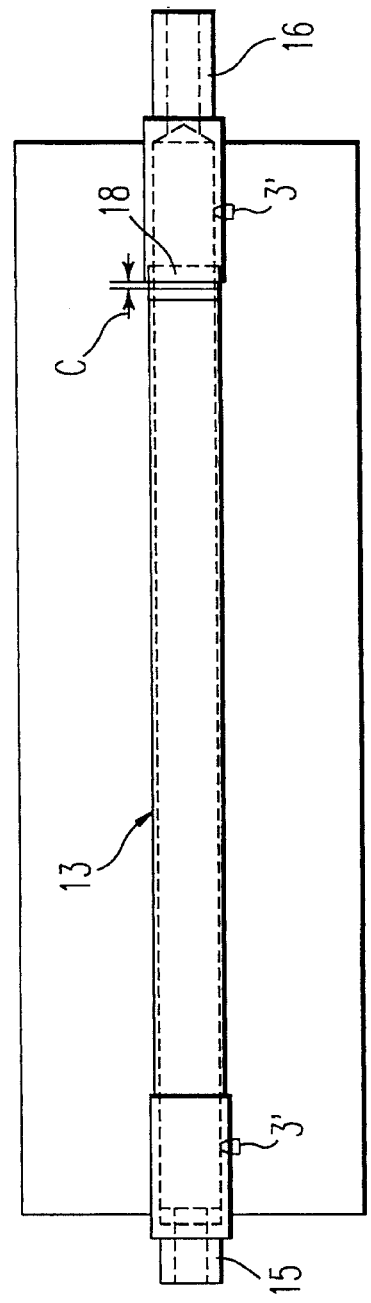

Referring now to FIGS. 2A–2C, the rotor assembly of the present invention will now be described. In accordance with the present invention, a shaft assembly is provided for torsionally coupling the front and back ends of the rotor. The shaft assembly includes front and back shaft parts which are coupled to one another by a slip joint, and the front and back shaft parts are coupled, respectively, to the front and back ends of the rotor body.

FIG. 2A shows a pre-assembled condition of the back shaft 13, with the back shaft 13 including a front end part 8 and a back end part 7, between which is disposed a tubular body or pipe member 6. For increased strength and reduced thermal expansion/deformation, the parts 6, 7 and 8 are preferably formed of steel, and are hollow for reduced weight. It is to be understood, however, that various materials are also possible, and the shaft may be solid if desired. A titanium shaft assembly may be particularly advantageous, if the application justifies the cost. In addition, while the assembly described herein is currently believed to be the most convenient to manufacture utilizing available components, the assembly can be manufactured otherwise, and can be formed of different (and of a different number of) component parts than as specifically described herein. The front end part 8 and back end part 7 each include a round smaller diameter portion 8a, 7a which is received within the tubular shaft body 6. Forty-five degree taper portions 6b, 7b and 8b are provided such that the parts 6–8 may be welded to one another after the parts 7 and 8 are inserted into the tubular shaft body 6.

Referring to FIG. 2B, once the parts 6–8 are assembled and welded together, the shaft is machined to provide a cylindrical shaft, with the head portion of the front end part 8 of the shaft machined to provide a hexagonal head 14. In addition, the back end part 7 is machined to have a round reduced diameter as shown at 15. The hex head 14 forms a slip joint with a front shaft part (discussed hereinafter), while the round head 15 is received in a bearing which supports the back end of the rotor assembly. The vertical line shown at 19 identifies a diameter change resulting from the machining of the shaft, such that the portion of the back shaft 13 to the left of 19 (FIG. 2B) has a larger diameter than the portion to the right. The larger diameter portion provides an interference fit with the rotor body when the back shaft is inserted therein.

FIG. 2C shows a rotor body having a shaft assembly of the present invention disposed therein. The shaft assembly includes the back shaft part 13, and the front shaft part 16. As with the shaft portions 2 discussed with reference to the conventional arrangement (FIGS. 1A–B), the front and back shaft parts are disposed, with an interference fit, inside of the rotor body 1. In addition, taper pins (represented at 3' in FIG. 2C) extend into the front and back shaft parts 13, 16 from the cylindrical or tubular wall of the bore extending through the rotor body 1. However, in contrast to the conventional arrangement, with the present invention a shaft assembly is provided which extends along the length of the rotor, and couples the front and back ends of the rotor. The input shaft or front shaft part 16 includes a female hex recess 18 into which the hex head 14 of the back shaft part 13 is received. Although the illustrated embodiment provides the male hex on the back shaft part 13 and the female hex on front shaft part 16, it is to be understood that their positions can be reversed. In addition other interlocking configurations are possible (e.g., triangular, square, spline, pentagon), and the present invention is not limited the use of a hex male/female joint for the slip joint.

As indicated at C of FIG. 2C, an axial clearance is provided which accommodates for temperatures lower than the assembly temperature. For temperature increases, the front and back shaft parts 13, 16 move axially away from one another while maintaining a coupled relationship as the male part 14 slides within the female part 18. The clearance C can be provided between the respective shoulders adjacent the male and female parts of the front and back shafts, or the clearance C can be provided between the top of the male head and the bottom of the female aperture. Since the clearance C is provided to absorb the difference in contraction of the rotor body and shaft when the rotor temperature is decreased below the assembly temperature, it can be relatively small, for example, 0.03 inches.

The hex head 14 and female hex portion 18 provide a slip joint, such that the front and back shaft parts can move away from one another, while still maintaining a torsional and bending moment coupling between the front and back shaft parts, thus also providing a coupling between the front and back ends of the rotor body. Since the rotor body 1 is typically formed of aluminum (having a relatively high coefficient of thermal expansion), and the shaft assembly will be formed of a material having a lower coefficient of thermal expansion (having a higher strength), as the temperature of the assembly increases, the front and back shaft parts 16, 13 will move away from one another, while maintaining the coupled arrangement between the hex head 14 and female hex portion 18. Thus, the back shaft part 13 and the front shaft part 16 each include a half-slip joint, and combine to form a slip joint between the back shaft part 13 and the front shaft part 16. The slip joint is important in maintaining the coupled arrangement between the front and back shaft parts, and thus the coupled arrangement between the respective front and back ends of the rotor body 1. For example, if the slip joint were omitted, forces resulting from thermal expansion could cause a shearing of the taper pins (which couple the front and back shaft parts to the front and back of the rotor body). Any expansion differences in the radial direction are accommodated by the interference or press-fit between the front and back shaft parts 13, 16 and the respective front and back ends of the rotor body.

The slip joint is shown in FIG. 2C at a location toward the front side (or right side in FIG. 2C) of the rotor assembly as a manufacturing convenience. However, it is to be understood that the slip joint, or the interface between the front shaft part and the back shaft part, may be provided closer to the center, or closer to the back end of the rotor assembly.

As should be apparent from the foregoing, the present invention provides a rotor assembly for a supercharger in which the front and back ends of the rotor body are coupled by a shaft assembly extending through the rotor body. In addition, a slip joint is provided in the shaft assembly, thereby accommodating for any thermal expansion or deformation which occurs in the axial direction. Thus, the shaft assembly transmits forces from the front of the rotor to the back, while accommodating thermal expansion.

Figure 3:
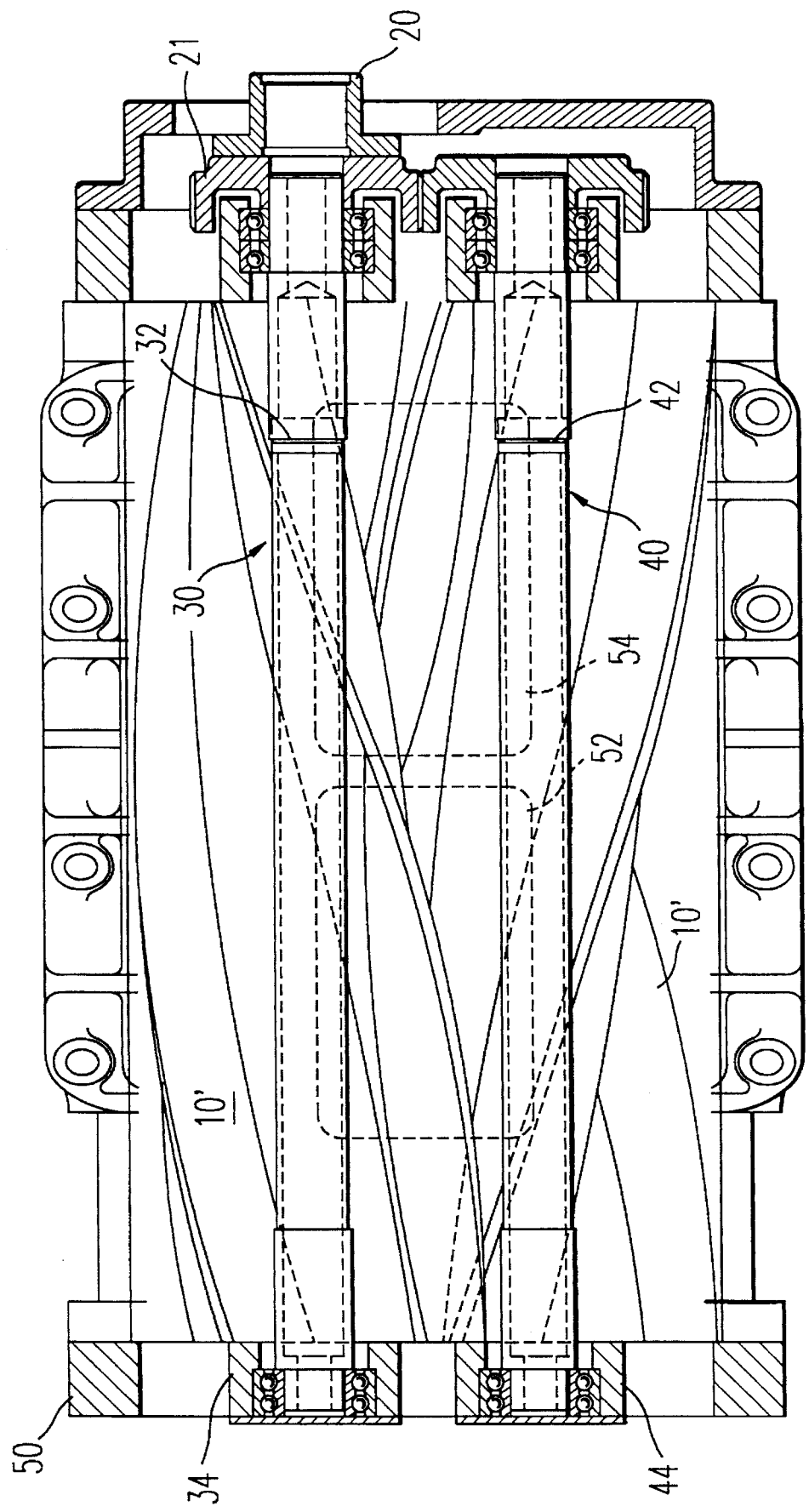
FIG. 3 is a cross-section of a supercharger utilizing a rotor assembly of the present invention.

Referring briefly to FIG. 3, a supercharger including the rotor and shaft assembly of the present invention will now be described. As shown in FIG. 3, an input shaft coupling member 20 is provided for transmitting input torque or input power to a timing gear 21. The input member 20 is coupled to a pulley, which in turn is driven by a known driving arrangement (not shown) which is coupled to the output shaft or drive shaft of the engine. The timing gear 21 meshes with a second timing gear 22, and each of the timing gears 21, 22 are drivingly coupled to a respective shaft assembly 30, 40. The shaft assemblies 30, 40 each include front and back shaft parts 13, 16 as discussed earlier with reference to FIGS. 2A–2C, and each couple the front and back sides of their respective rotor body. Each of the rotor bodies includes helical lobes 10' which mesh with one another, however, as discussed earlier, the present invention is not limited to superchargers, or helical lobe superchargers.

The slip joints for the respective shaft assemblies 30, 40 are indicated at 32, 42, representing the location at which the female hex portion 18 of the front shaft member (i.e., the front shaft part 16 of FIG. 2C) mates with the male hex portion 14 of the back shaft part, with an axial clearance of, for example, 0.03 inches. The back side of the supercharger includes conventional bearing assemblies 34, 44 for supporting the back shaft parts of the shaft assemblies 30, 40 for rotation within the supercharger housing 50. The rectangular windowed portions indicated in broken line at 52, 54 designate the discharge openings of the supercharger (the intake openings are not shown as a result of the cross-sectional representation provided in FIG. 3).

With the coupling between the front and back of the rotor body provided by the present invention, the torsional and bending deformation of the rotor body is decreased. It is believed that this deformation chiefly results from rapid acceleration requirements, however the high pressure or rapid pressure increases also contribute to the deformation of the rotor body. As a result of the reduced deformation provided by the present invention, the wear on the rotor body or the sealing strips of the rotor body is decreased, thereby reducing the maintenance requirements. Moreover, since the rotor deformation is decreased as a result of the present invention, the clearances between the meshing rotors, and between the rotors and the supercharger housing can be decreased, thereby increasing the efficiency of the supercharger, and providing a more rapid air boost such that the supercharger is able to respond more rapidly. Thus, the rotor assembly of the present invention is able to decrease maintenance requirements, while increasing efficiency and horsepower of the engine which is supercharged.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A rotor assembly comprising:
    a rotor body having front and back ends, and a bore extending through said rotor body; and
    a shaft assembly disposed in said bore, said shaft assembly coupled to said rotor body at said front and back ends, and wherein said shaft assembly includes a slip joint between said front and back ends.

2. The rotor assembly of claim 1, wherein said shaft assembly includes a front shaft part and a back shaft part, and wherein said slip joint is provided at an interface between said front shaft part and said back shaft part.

3. The rotor assembly of claim 2, wherein said slip joint includes a male part disposed on one of said front shaft part and said back shaft part, said slip joint further including a female part disposed on the other of said front shaft part and said back shaft part, and wherein said female part receives said male part with said male part slidable relative to said female part in an axial direction of the shaft assembly.

4. The rotor assembly of claim 3, wherein said male part has a polygonal cross-section and said female part has a corresponding polygonal cross-sectional aperture receiving said male part.

5. The rotor assembly of claim 2, wherein said front shaft part is coupled to said front end of said rotor body with an interference fit, and said back shaft part is coupled to said back end of said rotor body with an interference fit.

6. The rotor assembly of claim 5, wherein one of said front shaft part and said back shaft part includes:

a pair of end parts; and a tubular center part.

7. The rotor assembly of claim 6, wherein said pair of end parts are welded to said tubular center part.

8. The rotor assembly of claim 7, wherein one of said pair of end parts is machined to provide a round head, and the other of said pair of end parts is machined to provide a polygonal head.

9. The rotor assembly of claim 1, wherein said shaft assembly includes a front portion, a back portion, and a central portion between said front portion and said back portion, and wherein said central portion has a diameter smaller than a diameter of said front portion and said back portion.

10. The rotor assembly of claim 9, wherein said front portion and said back portion are respectively coupled to said front and back ends of said rotor body with an interference fit.

11. The rotor assembly of claim 10, wherein said rotor body is formed of aluminum, and said shaft assembly is formed of one of steel and titanium.

12. The rotor assembly of claim 1, wherein said shaft assembly is hollow.

13. The rotor assembly of claim 1, wherein said shaft assembly is hollow, and wherein said shaft assembly is formed of one of steel and titanium, and said rotor body is formed of aluminum.

14. The rotor assembly of claim 1, wherein said shaft assembly includes a back end supported for rotation in a bearing, said shaft assembly further including a front end coupled to a drive source.

15. The rotor assembly of claim 14, wherein said rotor body and said shaft assembly constitute a first rotor body and a first shaft assembly, said rotor assembly further including a second rotor body, and a second shaft assembly extending through said second rotor body, and wherein said second shaft assembly is drivingly coupled to said first shaft assembly.

16. The rotor assembly of claim 15, wherein said first and second rotor bodies and said first and second shaft assemblies are disposed in a supercharger housing.

17. A supercharger having a rotor assembly comprising:

a rotor body having front and back ends, and a bore extending through said rotor body;

a shaft assembly extending through said bore from said front end to said back end, said shaft assembly coupled to said rotor body at said front and back ends, said shaft assembly including a front shaft part and a back shaft part, and slip joint means for transmitting torque from said front shaft part to said back shaft part while allowing relative movement between said front shaft part and said back shaft part in an axial direction.

18. The supercharger of claim 17, wherein said rotor body constitutes a first rotor body and said shaft assembly constitutes a first shaft assembly, the supercharger further including a second rotor body and a second shaft assembly, said second shaft assembly including second slip joint means for coupling second front and back shaft portions while allowing axial movement between said second front and back shaft portions.

19. The supercharger of claim 18, wherein said first and second shaft assemblies are hollow.

20. The supercharger of claim 17, wherein said rotor body is formed of a first material and said shaft assembly is formed on a second material, and wherein said first material has a coefficient of thermal expansion which is larger than a coefficient of thermal expansion of said second material.

21. The supercharger of claim 17, wherein said shaft assembly is hollow, and wherein said slip joint means includes a male part having a polygonal head on one of said front shaft part and said back shaft part, said slip joint means further including a female part having a polygonal aperture in the other of said front shaft part and said back shaft part.

22. The supercharger of claim 17, wherein said front shaft part and said back shaft part are each coupled to the rotor body with an interference fit and with taper pins.

23. A supercharger comprising:

a first rotor body having front and back ends, and a bore extending therethrough;

a first shaft assembly extending through said bore of said first rotor body, said first shaft assembly including front and back portions connected by a central portion, and wherein said front and back portions have a larger diameter than said central portion, and wherein said front and back portions are respectively coupled to said front and back ends of said first rotor body with an interference fit, said first shaft assembly further including a slip joint between said front and back portions for allowing relative movement between said front and back portions in an axial direction of said first shaft assembly;

a second rotor body meshing with said first rotor body, said second rotor body including front and back ends and a bore extending therethrough; and a second shaft assembly extending through said bore of said second rotor body, said second shaft assembly including front and back portions connected by a central portion, and wherein said front and back portions have a larger diameter than said central portion, and wherein said front and back portions are respectively coupled to said front and back ends of said second rotor body with an interference fit, said second shaft assembly further including a slip joint between said front and back portions for allowing relative movement between said front and back portions in an axial direction of said second shaft assembly.

24. The supercharger of claim 23, wherein said front and back portions of each of said first and second shaft assemblies are also coupled to said first and second rotor bodies with taper pins.

25. The shaft assembly of claim 23, wherein each of said first and second shaft assemblies include:

a front shaft part having said front shaft portion thereon;

a back shaft part having said back shaft portion thereon;

wherein said slip joint couples said front shaft part and said back shaft part; and wherein one of said front shaft part and said back shaft parts includes a pair of end parts welded to a central tubular part, one of said pair of end parts having a round head, the other of said pair of end parts having a polygonal head.

* * * * *